(No Model.)
F. SHERROD.
COMBINED COLTER AND SCRAPER.
No. 504,252. Patented Aug. 29, 1893.
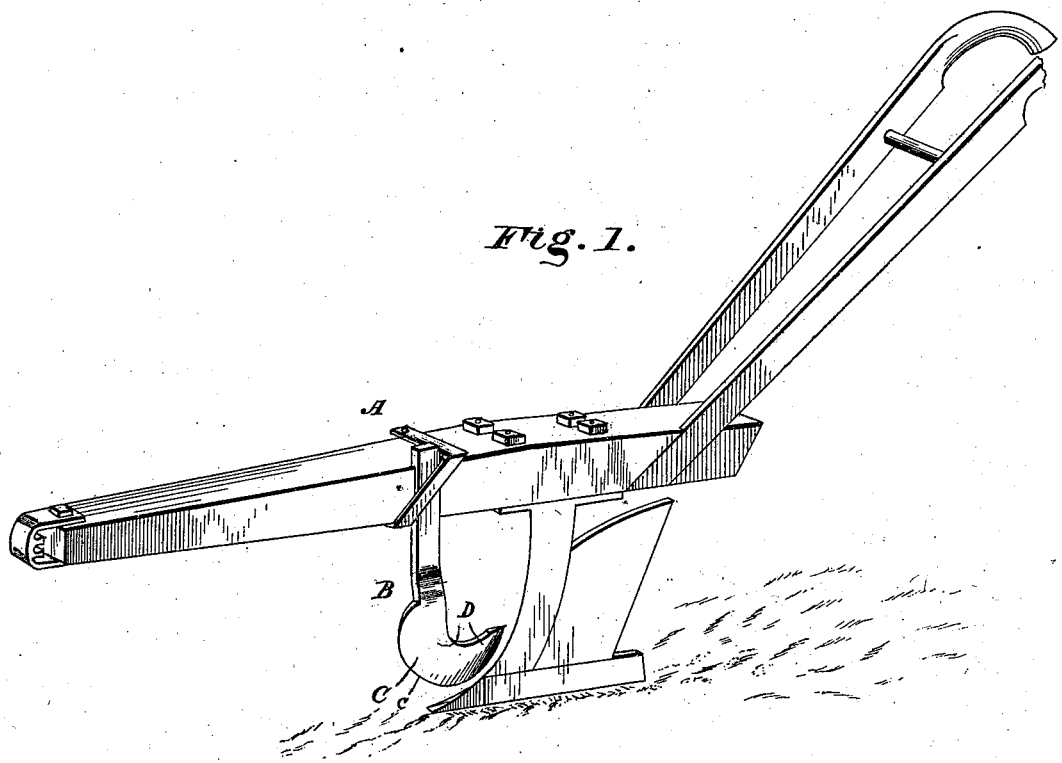
Fig. 1.
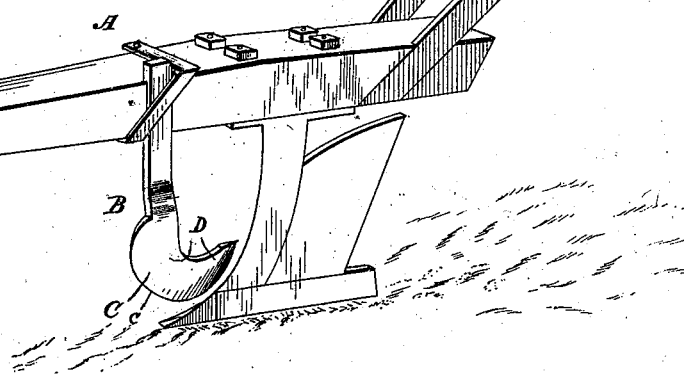
Fig. 3.
Fig. 2.
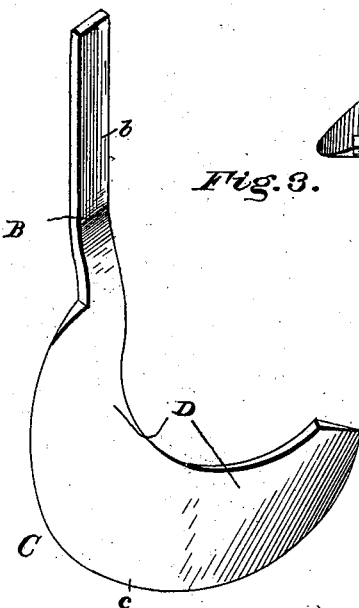
Witnesses
Inventor
Fletcher Sherrod.
By his Attorneys,

UNITED STATES PATENT OFFICE.

FLETCHER SHERROD, OF MADISON STATION, MISSISSIPPI, ASSIGNOR TO HIMSELF AND HENRY B. CAGE, OF SAME PLACE.

COMBINED COLTER AND SCRAPER.

SPECIFICATION forming part of Letters Patent No. 504,252, dated August 29, 1893.

Application filed September 10, 1892. Renewed July 13, 1893. Serial No. 480,424. (No model.)

*To all whom it may concern:*

Be it known that I, FLETCHER SHERROD, a citizen of the United States, residing at Madison Station, in the county of Madison and State of Mississippi, have invented a new and useful Combined Colter and Scraper, of which the following is a specification.

This invention relates to colters; and it has for its object to provide an improved device of this character designed for attachment to any suitable plow and not only adapted to be used as a colter for cutting the dirt loose in advance of the plow, but also acts in the capacity of a scraper for scraping the sides of the row while the plow bars it off.

To this end the invention contemplates an improved construction of a combined colter and scraper.

With these and many other objects in view which will readily appear as the nature of the invention is better understood, the same consists in the novel construction, combination and arrangement of parts hereinafter more fully described, illustrated and claimed.

In the accompanying drawings:—Figure 1 is a perspective view of a plow provided with a colter constructed in accordance with this invention. Fig. 2 is a detail in perspective of the colter detached. Fig. 3 is a top plan view of the colter.

Referring to the accompanying drawings:— A represents a plow of ordinary construction, though preferably of the type known as turning plows, and particularly adapted for plowing between cotton rows. Suitably secured or clamped to the plow beam directly in advance of the plow point or shovel is the combined colter and scraper B. The said colter or scraper B is provided with a securing shank *b* clamped to the side of the plow beam and with the lower widened curved colter and scraper blade C. The said combined colter and scraper blade C is provided with a continuous lower cutting edge *c*, that is designed to scrape the side of the cotton row as the plow bars it off, thereby leaving the cotton on a narrow ridge, and therefore making hoeing much lighter than it otherwise would be, said cutting edge also cutting the dirt loose so that the same will not be torn by the plow and endanger the young cotton. It will also be observed by the drawings that the flattened scraping and cutting blade is provided with a mold-board twist D which corresponds to the curvature of the mold board of the plow and is also curved in the same direction, so that the combined colter and scraper will throw all the dirt, weeds, &c., cut by the same, onto the mold board of the plow.

Having thus described my invention, what I claim, and desire to secure by Letters Patent, is—

The combination with a plow beam and landside plow, of a combined colter and scraper arranged in advance of the plow, and consisting of an upper securing shank terminating in a lower widened rearwardly curved cutting and scraping blade, said blade being provided with a continuous lower curved cutting edge and having a mold board twist corresponding to the curvature of the mold board of the plow and disposed in the same direction as said mold board and in line therewith, substantially as set forth.

In testimony that I claim the foregoing as my own I have hereto affixed my signature in the presence of two witnesses.

FLETCHER SHERROD.

Witnesses:
   T. H. BOSWELL,
   F. L. HAY.